United States Patent
Yen et al.

(10) Patent No.: US 7,438,426 B2
(45) Date of Patent: Oct. 21, 2008

(54) PROJECTION DISPLAY APPARATUS AND DIGITAL ZOOMING METHOD THEREOF

(75) Inventors: Chien-Wu Yen, Miao-Li (TW); Tzu-Hai Chung, Miao-Li (TW); Tung-Lung Lai, Miao-Li (TW)

(73) Assignee: Coretronic Corporation, Hsinchu (TW)

( * ) Notice: Subject to any disclaimer, the term of this patent is extended or adjusted under 35 U.S.C. 154(b) by 295 days.

(21) Appl. No.: 11/492,783

(22) Filed: Jul. 26, 2006

(65) Prior Publication Data

US 2007/0030575 A1  Feb. 8, 2007

(30) Foreign Application Priority Data

Aug. 3, 2005  (TW) ............................... 94126419 A

(51) Int. Cl.
*G03B 21/14* (2006.01)
(52) U.S. Cl. ...................... 353/121; 353/122; 345/620; 345/667
(58) Field of Classification Search ................. 353/100, 353/101, 121, 122; 345/620, 660, 667
See application file for complete search history.

(56) References Cited

U.S. PATENT DOCUMENTS

| 7,093,940 B2 * | 8/2006 | Kubo et al. ................... 353/69 |
| 7,150,536 B2 * | 12/2006 | Inoue .......................... 353/69 |
| 7,237,903 B2 * | 7/2007 | Nagayoshi ................... 353/30 |
| 2005/0180655 A1 * | 8/2005 | Ohta et al. .................. 382/275 |
| 2006/0007244 A1 * | 1/2006 | Matsumoto ................. 345/619 |

* cited by examiner

*Primary Examiner*—William C. Dowling
(74) *Attorney, Agent, or Firm*—Bacon & Thomas, PLLC

(57) ABSTRACT

A projection display apparatus and digital zooming method thereof is disclosed. The projection display apparatus receives a first image and includes a control unit, an image processor, an image scaler, a projection lens and a display unit. The control unit is for calculating an image area needed to be removed from the first image according to a zooming multiple. The image processor is for removing the image area form the first image to generate a second image. The image scaler is for scaling the second image to generate a third image. The display unit is for receiving the third image and projecting the third image onto a screen via the projection lens. The third image has a specific pixel count relative to the display unit.

9 Claims, 2 Drawing Sheets

PROJECTION DISPLAY APPARATUS AND DIGITAL ZOOMING METHOD THEREOF

This application claims the benefit of Taiwan application Serial No. 94126419, filed Aug. 3, 2005, the subject matter of which is incorporated herein by reference.

BACKGROUND OF THE INVENTION

1. Field of the Invention

The invention relates in general to a projection display apparatus, and more particularly to a digital zooming method applied to a projection display apparatus.

2. Description of the Related Art

Due to requirements of consumers for a multi-function electronic technology, a projection display apparatus tends to be designed to have a plurality of functions. For example, the projection display apparatus equipped with digital zooming function can perform an image scaling operation on a special area of the image according to a zooming multiple selected by a user.

Referring to FIG. 1, a block diagram of a conventional projection display apparatus is shown. A projection display apparatus 10 includes a zooming circuit 110, a flash memory 120, a control unit 130, a display unit 150 and an image scaler 140. The projection display apparatus 10 uses the zooming circuit 110 to perform a digital zooming function, and records a parameter table 122 in the flash memory 120. If the user wants to scale a certain region of the first image P1, the control unit 130 performs a calculation process on the first image P1 to generate a second image P2 via the zooming circuit 110 and the parameter table 122 according to a zooming multiple selected by the user. The projection display apparatus 10 scales the second image P2 by using the image scaler 140 to generate a third image P3, the third image P3 has a specific pixel count relative to the display unit 150.

However, to use the zooming circuit 110 not only reduces an available space in the conventional projection display apparatus 10, but also increases a producing cost and a market competitiveness of the conventional projection display apparatus 10. Besides, the parameter table 122 also occupies space of the flash memory 120, thereby reducing an accessible volume of the flash memory 120.

SUMMARY OF THE INVENTION

It is therefore an object of the present invention to provide a projection display apparatus and a digital zooming method thereof. The digital zoom is achieved by controlling a size of a first image inputted to n image scaler of the projection display apparatus.

The present invention achieves the above-identified object by providing a projection display apparatus for receiving a first image. The projection display apparatus includes a control unit, an image proecessor, an image scaler, a projection lens and a display unit. The control unit is for calculating an image area needed to be removed from the first image according to a zooming multiple. The image processor is for removing the image area form the first image to generate a second image. The image scaler is for scaling the second image to generate a third image. The display unit is for receiving the third image and projecting the third image onto a screen via the projection lens. The third image has a specific pixel count relative to the display unit.

The present invention achieves the above-identified object by providing a digital zooming method applied to a projection display apparatus for receiving a first image. The projection display apparatus includes a projection lens and a display unit. The digital zooming method includes selecting a zooming multiple; calculating an image area needed to be removed from the first image according to the zooming multiple; generating a second image by removing the image area from the first image; scaling the second image to generate a third image having a specific pixel count relative to the display unit; and outputting the third image to the display unit, and then projecting the third image onto a screen via the projection lens.

Other objects, features, and advantages of the present invention will become apparent from the following detailed description of the preferred but non-limiting embodiments. The following description is made with reference to the accompanying drawings.

DETAILED DESCRIPTION OF THE INVENTION

Figure 1:
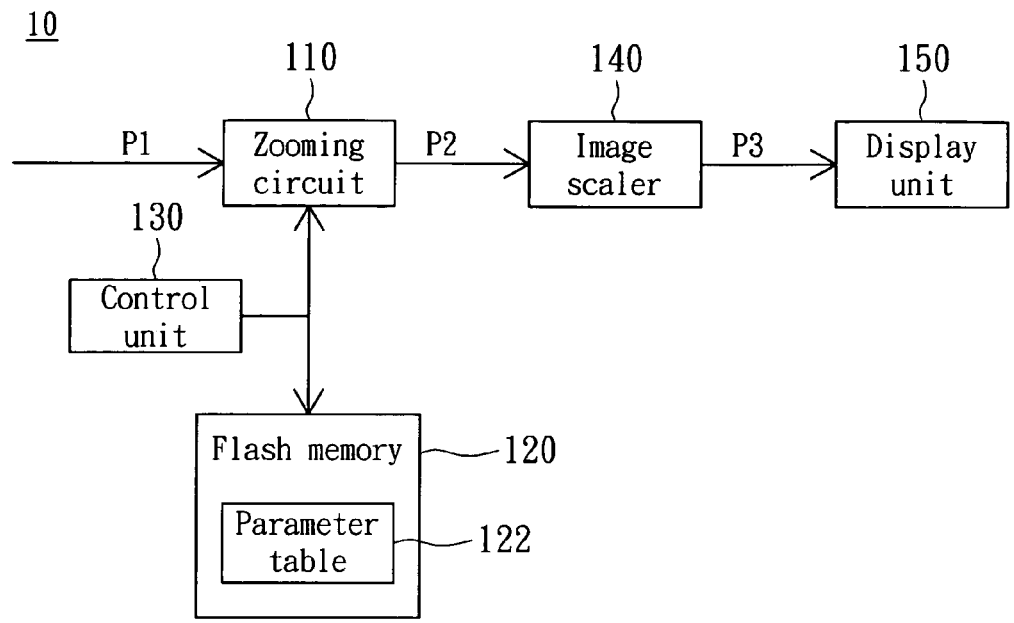
FIG. 1 is a block diagram of a conventional projection display apparatus.
Figure 2:
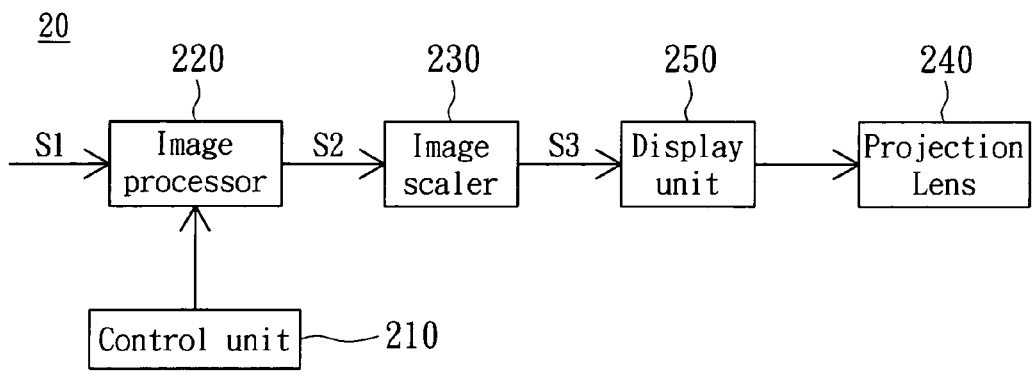
FIG. 2 is a block diagram of the projection display apparatus of the present invention.

Referring to FIG. 2, a block diagram of the projection display apparatus of the present invention is shown. The projection display apparatus 20 includes a control unit 210, an image processor 220, an image scaler 230, a display unit 250 and a projection lens 240. The projection display apparatus 20 receives a first image S1, such as a staggered or a non-staggered image. The control unit 210 calculates an image area needed to be removed from the first image S1 according to a zooming multiple selected by a user. The image processor 220 removes the image area from the first image S1 to generate a second image S2. The image scaler 230 scales the second image S2 to have a pixel count equal to a pixel count of the display unit 250 to generate a third image S3. The third image S3 has the pixel count the same as the pixel count of the display unit 250. The display unit 250 is, for example, a digital micro-mirror device (DMD) or a liquid crystal display (LCD). The display unit 250 receives the third image S3 and projects the third image S3 onto a screen via the projection lens 240.

Furthermore, the image scaler 230 scales the pixel count of the second image S2 to be equal to the pixel count of the display unit 250. When the second image S2 inputted to the image scaler 230 is getting smaller, the image scaler 230 scales the second image S2 by a larger zooming multiple such that the pixel count of the third image S3 maintains the same as the pixel count of the display unit 250. For example, when the display unit 250 has a pixel count of 1024×768, if the pixel count of the second image S2 is 512×384, the image scaler 230 enlarges the second image S2 by four times such that the second image S2 has 1024×768 pixels. If the second image S2 has 256×192 pixels, the image scaler 230 enlarges the second image S2 by sixteen times such that the second image S2 has 1024×768 pixels. In this way, the third image S3 has the pixel count the same as the pixel count of the display unit 250.

Therefore, the zooming multiple of the projection display apparatus 20 uses for scaling the second image S2 depends on a size of the second image S2. The smaller the second image S2 is, the larger the zooming multiple of the second image S2 is. Conversely, the larger the second image S2 is, the smaller the zooming multiple of the second image S2 is. In other words, the projection display apparatus 20 controls the image processor 220 to remove the image area from the first image S1 to achieve scaling effects under various zooming multiples. The larger the image area to be removed from the first image is, the smaller the second image S2 is, which represents the larger the zooming multiple of the first image S1 is. Conversely, the smaller the image area to be removed from the first image S1 is, the larger the second image S2 is, which represents the smaller the zooming multiple of the first image S1 is.

The image area removed from the first image S1 by the image processor 220 is determined by the control unit 210. The control unit 210 determines the image area to be removed from the first image S1 according to an algorithm stored in a memory of the control unit 210. The algorithm calculates and generates the image area to be removed from the first image S1 according to the pixel count of the first image S1 and the zooming multiple selected by the user. For example, the algorithm can calculate the image area to be removed from the first image S1 according to an equation $$r = i \times \frac{\sqrt{f} - 1}{\sqrt{f}},$$

wherein r is the image area to be removed from the first image S1, i is the pixel count of the first image S1 and f is the zooming multiple selected by the user.

For example, if the display unit 250 has 1024×768 pixels, when the first image S1 has 512×384 pixels and the user wants to enlarge the first image S1 by sixteen times, the control unit 210 calculates and generates that the image area to be removed from the first image S1 has 512×384×¾ pixels according to the above-mentioned equation. The image processor 220 removes the above-mentioned image area from the first image S1 to generate the second image S2. The second image S2 is scaled by the image scaler 230 to form the third image S3 having 1024×768 pixels. The third image S3 is further projected onto a screen via the projection lens 240 and the display unit 250 to achieve a sixteen-time digital zooming effect.

The projection display apparatus 20 calculates an image area needed to be removed from the first image S1 by the algorithm according to a zooming multiple, the image processor 220 removes the image area from the first image S1 to generate the second image S2, and then the image scaler 230 scales the second image S2 to have the same pixel count as the display unit 250 to achieve the digital zooming effect. Therefore, the projection display apparatus 20 performs the digital zooming function without the zooming circuit 110 and the parameter table 122 in the conventional projection display apparatus 10.

Figure 3:
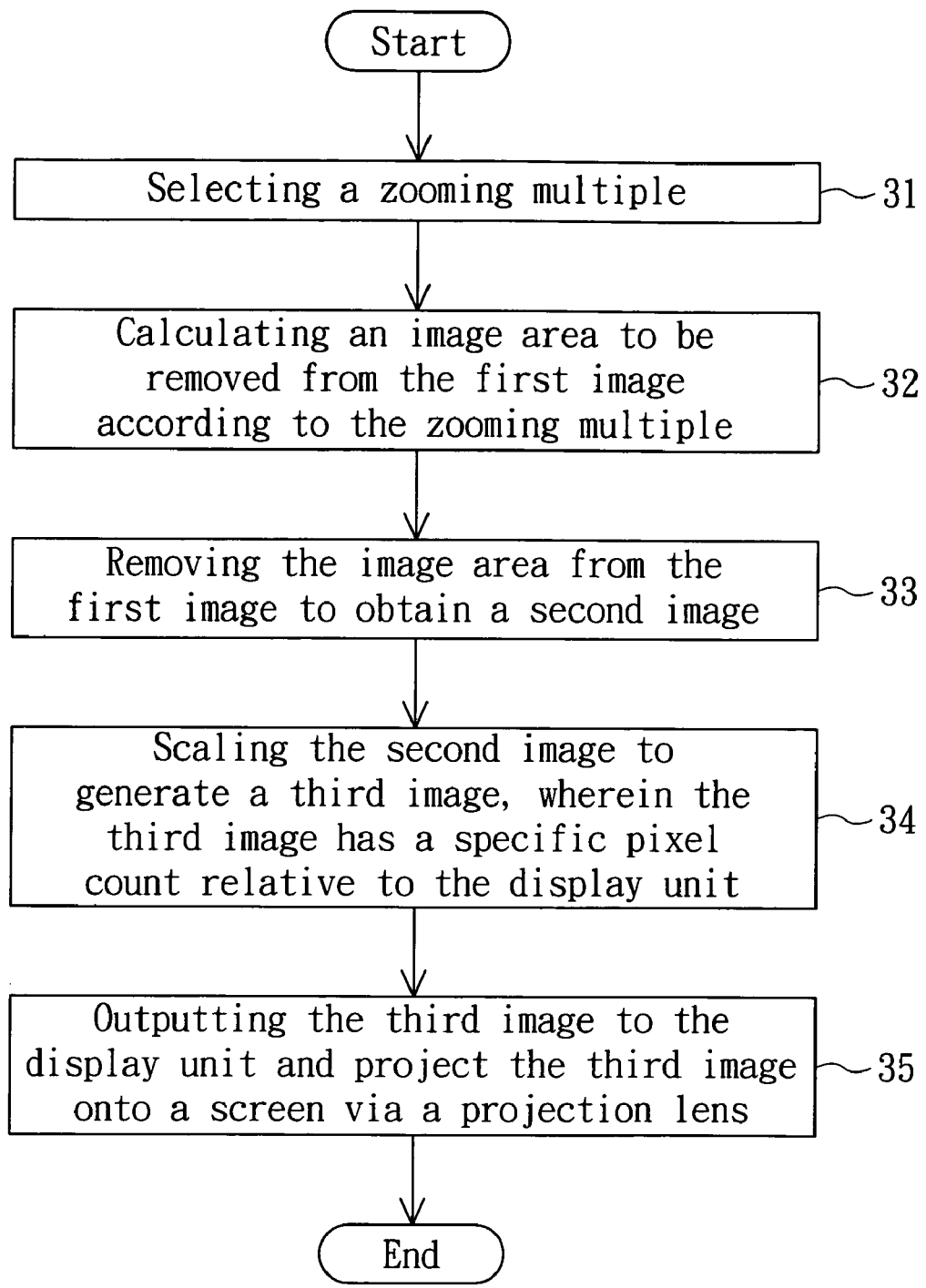
FIG. 3 is a flow chart of a digital zooming method of the present invention.

Referring to FIG. 3, a flow chart of a digital zooming method of the present invention is shown. A digital zooming method is applied to the projection display apparatus 20. The projection display apparatus 20 is for receiving the first image S1 and includes the projection lens 240 and the display unit 250. First, a step 31 is selecting a zooming multiple. Following that, a step 32 is calculating the image area needed to be removed from the first image S1 according to the zooming multiple. Next, a step 33 is removing the image area from the first image S1 to generate the second image S2. Then, a step 34 is scaling the second image S2 to generate the third image S3, wherein the third image S3 has a specific pixel count relative to the display unit 250. Finally, a step 35 is outputting the third image S3 to the display unit 250 and projecting the third image S3 onto a screen via the projection lens 240.

The present invention provides a projection display apparatus, which performs a digital zooming function by an algorithm and a digital zooming method thereof. The image area to be removed from the first image is calculated by algorithm according to the zooming multiple selected by the user, and the image with some area removed is scaled by the image scaler to have the same pixel count as the display unit. Therefore, the digital zooming effect can be achieved without the zooming circuit for the digital zooming function and the parameter table stored in the flash memory of a conventional projection display apparatus. As a result, the projection display apparatus of the present invention has a lower production cost and higher market competitiveness.

While the present invention has been described by way of example and in terms of a preferred embodiment, it is to be understood that the present invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projection display apparatus, for receiving a first image, the projection display apparatus comprising:
   a control unit, for calculating an image area needed to be removed from the first image according to a zooming multiple;
   an image processor, for removing the image area from the first image to generate a second image;
   an image scaler, for scaling the second image to generate a third image;
   a projection lens, and
   a display unit, for receiving the third image and projecting the third image onto a screen via the projection lens, wherein the third image has a specific pixel count relative to the display unit.

2. The projection display apparatus according to claim 1, wherein the first image is a staggered image.

3. The projection display apparatus according to claim 1, wherein the first image is a non-staggered image.

4. The projection display apparatus according to claim 1, wherein the control unit calculates the image area according to an algorithm.

5. The projection display apparatus according to claim 4, wherein the control unit further comprises a memory for storing the algorithm.

6. A digital zooming method, applied to a projection display apparatus for receiving a first image, the projection display apparatus comprising a projection lens and a display unit, the digital zooming method comprising:
   selecting a zooming multiple;
   calculating an image area needed to be removed from the first image according to the zooming multiple;
   generating a second image by removing the image area from the first image;
   scaling the second image to generate a third image having a specific pixel count relative to the display unit; and
   outputting the third image to the display unit, and then projecting the third image onto a screen via the projection lens.

7. The digital zooming method according to claim 6, wherein the first image is a staggered image.

8. The digital zooming method s according to claim 6, wherein the first image is a non-staggered image.

9. The digital zooming method according to claim 6, wherein the control unit calculates the image area according to an algorithm.

* * * * *